United States Patent
Kimura et al.

(10) Patent No.: US 12,047,658 B2
(45) Date of Patent: Jul. 23, 2024

(54) CONTROL APPARATUS, CONTROL METHOD, AND PROGRAM

(71) Applicant: NIPPON TELEGRAPH AND TELEPHONE CORPORATION, Tokyo (JP)

(72) Inventors: Takuto Kimura, Musashino (JP); Arifumi Matsumoto, Musashino (JP); Tatsuaki Kimura, Osaka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 304 days.

(21) Appl. No.: 17/607,576

(22) PCT Filed: May 8, 2020

(86) PCT No.: PCT/JP2020/018732
§ 371 (c)(1),
(2) Date: Oct. 29, 2021

(87) PCT Pub. No.: WO2020/230740
PCT Pub. Date: Nov. 19, 2020

(65) Prior Publication Data
US 2022/0224990 A1    Jul. 14, 2022

(30) Foreign Application Priority Data
May 15, 2019  (JP) ................................ 2019-092374

(51) Int. Cl.
*H04N 21/6373*    (2011.01)
*G06F 17/18*    (2006.01)

(52) U.S. Cl.
CPC ......... *H04N 21/6373* (2013.01); *G06F 17/18* (2013.01)

(58) Field of Classification Search
CPC ........................... H04N 21/6373; G06F 17/18
See application file for complete search history.

(56) References Cited

U.S. PATENT DOCUMENTS

| 2016/0275833 A1* | 9/2016 | Forbes | H04N 21/4668 |
| 2017/0286839 A1* | 10/2017 | Parker | G06N 20/20 |
| 2020/0099733 A1* | 3/2020 | Chu | H04N 21/8456 |

OTHER PUBLICATIONS

Pierre Lebreton et al., "Study on Viewing Time with Regards to Quality Factors in Adaptive Bitrate Video Streaming", 2018 IEEE 20th International Workshop on Multimedia Signal Processing (MMSP), pp. 1-6.
Te-Yuan Huang et al., "A Buffer-Based Approach to Rate Adaptation: Evidence from a Large Video Streaming Service". ACM SIGCOMM, Aug. 17, 2014.

(Continued)

*Primary Examiner* — Jefferey F Harold
*Assistant Examiner* — Franklin S Andramuno
(74) *Attorney, Agent, or Firm* — IPUSA, PLLC

(57) ABSTRACT

A moving image control apparatus is a control device that realizes bitrate control in a moving image streaming service, which includes a calculation means for calculating a quality target value used for the bitrate control such that a utility function including a predetermined engagement index value is optimized through Bayesian optimization.

4 Claims, 4 Drawing Sheets

(56) References Cited

OTHER PUBLICATIONS

Hongzi Mao et al., "Neural Adaptive Video Streaming with Pensieve", Proceedings of the Conference of the ACM Special Interest Group on Data Communication (SIGCOMM '17), Aug. 21, 2017, pp. 197-210.

Takuto Kimura et al., "A Video Bit Rate Selection Method to Reduce the Traffic Volume While Maintaining QoE", IEICE Technical Report, vol. 117, No. 159, 2017, pp. 1-6.

Kazuhisa Yamagishi and Takanori Hayashi, "Parametric Quality-Estimation Model for Adaptive-Bitrate-Streaming Services", IEEE Transactions on Multimedia, vol. 19, No. 7, 2017, pp. 1545-1557.

Takuto Kimura et al., "Video Engagement Control with Bayesian Optimization", IEICE Technical Report, vol. 118, No. 503, 2019.

\* cited by examiner

FIG.2

| VIEWING CONDITIONS | LIST OF AVERAGES $\mu$ | LIST OF STANDARD DEVIATIONS $\sigma$ | NUMBER OF VIEWS |
|---|---|---|---|
| (SERVICE A, CONTENT a) | [0.30, 0.31, 0.32, 0.30 ... 0.50] | [0.10, 0.15, 0.20, ... 0.10] | 100 |
| (SERVICE A, CONTENT b) | [0.20, 0.21, 0.22, 0.20 ... 0.20] | [0.01, 0.05, 0.02, ... 0.01] | 200 |
| (SERVICE A, CONTENT c) | [0.28, 0.30, 0.32, 0.11 ... 0.10] | [0.11, 0.18, 0.23, ... 0.14] | 400 |
| (SERVICE B, CONTENT a) | [0.45, 0.44, 0.42, 0.40 ... 0.40] | [0.50, 0.51, 0.52, ... 0.44] | 100 |

DISTRIBUTION INFORMATION (List of standard deviations σ, Number of views)

FIG.3

| VIEWING CONDITIONS | ESTIMATED QoE | UTILITY FUNCTION VALUE |
|---|---|---|
| (SERVICE A, CONTENT a) | 3.7 | 0.8 |
| (SERVICE A, CONTENT a) | 3.5 | 0.9 |
| (SERVICE A, CONTENT b) | 3.2 | 0.2 |
| (SERVICE A, CONTENT c) | 3.2 | 0.7 |

VIEWING INFORMATION

CONTROL APPARATUS, CONTROL METHOD, AND PROGRAM

TECHNICAL FIELD

The present invention relates to a control apparatus, a control method, and a program.

BACKGROUND ART

Currently, video streaming through the Internet is becoming more widespread. It is important for a video streaming business operator to extend a viewing time of a video (hereinafter, a video will also be referred to as a "moving image") as long as possible in order to continue business. Since a viewing time is affected by quality of experience (QoE) (refer to NPL 1), it is necessary to improve the QoE of a moving image in order to extend a viewing time of the moving image. On the other hand, when QoE is excessively improved, costs increase. Here, it is assumed that costs indicate power consumed by a terminal (hereinafter, also referred to as a "client") on which moving images are viewed, loads applied to a network apparatus, loads applied to a moving image delivery server, communication costs that a moving image streaming business operator pays a content delivery network (CDN), communication costs that a user (moving image viewer) pays a communication company on contract, and the like. Accordingly, in moving image delivery, it is necessary to control QoE in consideration of both engagement such as a viewing time and costs.

Currently, an adaptive bitrate (ABR) is generally used to perform moving image delivery. In an ABR, moving image data is segmented into data called chunks at intervals of several seconds in advance and then each chunk is re-encoded at a plurality of bitrates and stored in a server. In addition, a client repeats an operation of selecting an appropriate bitrate for each chunk and requesting the server on the basis of a network state and a buffer amount state. At this time, an algorithm of selecting a bitrate becomes a factor that significantly affects final quality of experience and traffic costs. Accordingly, it is important to appropriately select a bitrate in order to appropriately control engagement and costs.

Furthermore, numerous bitrate selection algorithms have been proposed (e.g., NPL 2 and NPL 3).

CITATION LIST

Non Patent Literature

[NPL 1] P. Lebreton, K. Kawashima, K. Yamagishi, and J. Okamoto, "Study on Viewing Time with Regards to Quality Factors in Adaptive Bitrate Video Streaming", 2018 IEEE 20th International Workshop on Multimedia Signal Processing (MMSP), Vancouver, BC, Canada, 2018, pp. 1-6.

[NPL 2] T. Y. Huang, R. Johari, N. McKeown, M. Trunnell, and M. Watson, "A Buffer-Based Approach to Rate Adaptation: Evidence from a Large Video Streaming Service", In Proc. ACM SIGCOMM, 2014.

[NPL 3] Hongzi Mao, Ravi Netravali, and Mohammad Alizadeh, 2017, "Neural Adaptive Video Streaming with Pensieve", In Proceedings of the Conference of the ACM Special Interest Group on Data Communication (SIGCOMM '17), ACM, New York, NY, USA, 197-210.

[NPL 4] Takuto Kimura, Arifumi Matsumoto, Takafumi Okuyama, and Jun Okamoto, "A Video Bitrate Selection Method to Reduce the Traffic Volume While Maintaining QoE", IEICE Technical Report, vol. 117, no. 159, CQ2017-49, July 2017.

[NPL 5] K. Yamagishi and T. Hayashi, "Parametric Quality-Estimation Model for Adaptive-Bitrate Streaming Services", IEEE Transactions on Multimedia, Vol. 19, Issue. 7, pp. 1545-1557, 2017.

SUMMARY OF THE INVENTION

Technical Problem

As represented in the aforementioned NPL 2 and NPL 3, numerous bitrate selection algorithms have been proposed. However, all of them aim to maximize QoE or indexes similar to QoE (e.g., an average bitrate or a bitrate variation, a stop time, a weighted sum of the number of stops, and the like) and a method of directly controlling engagement does not exist.

If engagement characteristics with respect to change in QoE are ascertained in advance, control is possible if an objective function is set according to the characteristics but the characteristics are generally unknown. In addition, if data can be sufficiently accumulated, engagement characteristics can be elucidated on the basis of the data, but engagement cannot be controlled until data is sufficiently accumulated. Furthermore, since engagement characteristics are different for content, users and services, a large amount of data is necessary to clarify each engagement characteristic.

An object of the present invention devised in view of the aforementioned circumstance is to simultaneously control engagement and costs.

Means for Solving the Problem

To accomplish the aforementioned object, a moving image control apparatus in an embodiment of the present invention is a control apparatus that realizes bitrate control in a moving image streaming service, which includes a calculation means for calculating a quality target value used for the bitrate control such that a utility function including a predetermined engagement index value is optimized through Bayesian optimization.

Effects of the Invention

It is possible to simultaneously control engagement and a cost.

BRIEF DESCRIPTION OF DRAWINGS

FIG. 2 is a diagram illustrating an example of distribution information.

FIG. 3 is a diagram illustrating an example of viewing information.

DESCRIPTION OF EMBODIMENTS

Hereinafter, an embodiment of the present invention will be described. In the embodiment of the present invention, a moving image control system 1 which simultaneously controls engagement and costs and realizes bitrate control with balanced engagement and costs while estimating unknown engagement characteristics using Bayesian optimization for a moving image streaming service will be described.

Here, in the embodiment of the present invention, maximization of a utility function composed of an engagement index and a cost is performed by optimizing a QoE target value provided in a bitrate selection method disclosed in the aforementioned NPL 4. The bitrate selection method disclosed in NPL 4 is a bitrate selection method of minimizing costs while satisfying a provided QoE target value.

Here, when the utility function is denoted by "Utility", the utility function is represented as Utility=e−w×c. e represents an engagement index and, for example, can be obtained by e=(viewing time)/(content length). For example, an engagement index when content with a content length of 180 seconds is viewed for 135 seconds is e=135/180=0.75.

In addition, c represents a cost and, for example, can be obtained by c=(actually transmitted data amount)/(maximum data amount that can be transmitted). For example, when content with a maximum bitrate of 3000 kbps is viewed for 135 seconds and a data amount transmitted at this time is 30 MB, c=30/(3000×135/8/1000)≈0.59. The QoE target value is optimized using Bayesian optimization which will be described later.

In addition, w is a real number indicating a weight for balancing engagement and costs and is assumed to be a predetermined number.

<Overall Configuration of Moving Image Control System 1>

Figure 1:
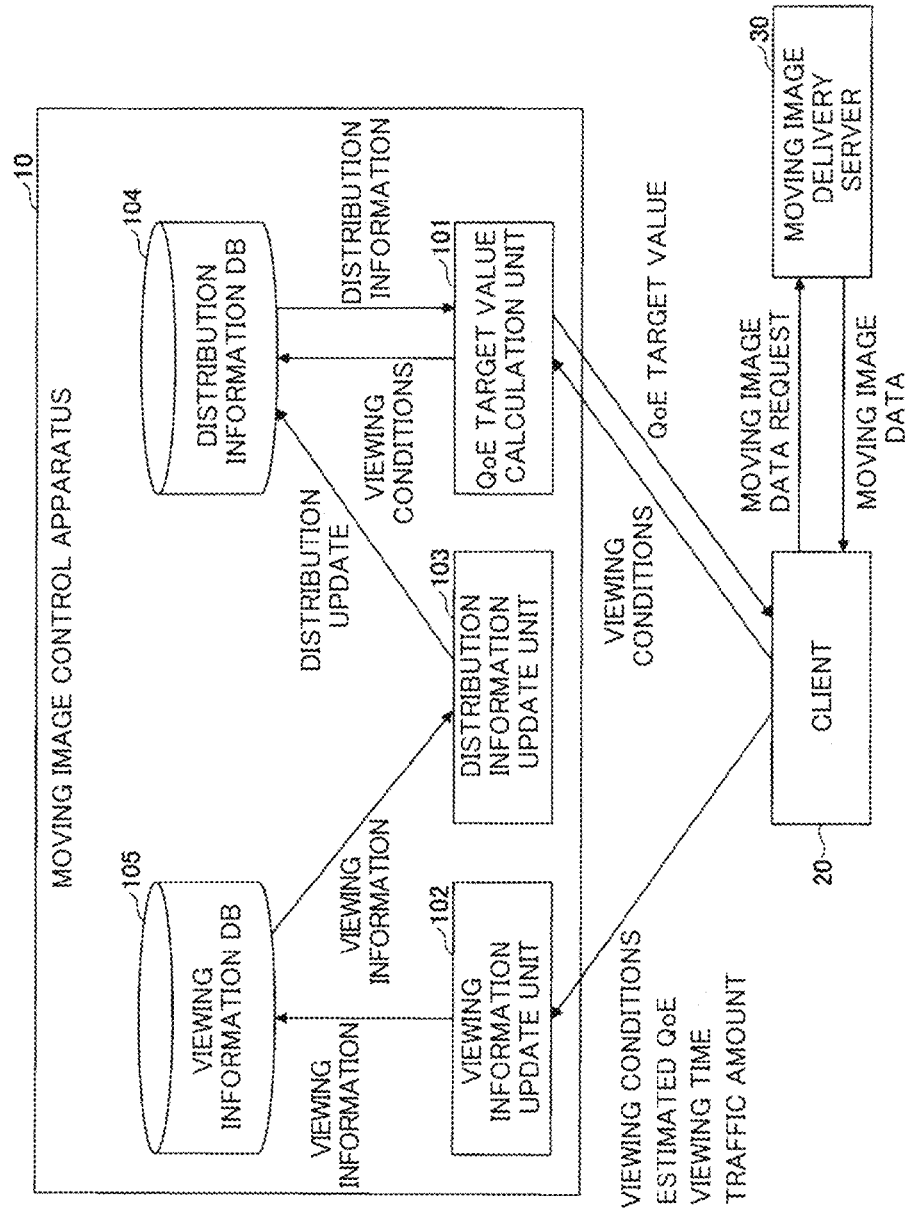
FIG. 1 is a diagram illustrating an example of an overall configuration of a moving image control system in an embodiment of the present invention.

First, the overall configuration of the moving image control system 1 in an embodiment of the present invention will be described with reference to FIG. 1. FIG. 1 is a diagram illustrating an example of the overall configuration of the moving image control system 1 in an embodiment of the present invention.

As illustrated in FIG. 1, the moving image control system 1 in the embodiment of the present invention includes a moving image control apparatus 10, one or more clients 20, and one or more moving image delivery servers 30. Meanwhile, the moving image control apparatus 10, the clients 20, and the moving image delivery servers 30 may be connected, for example, through a communication network such as the Internet such that they can communicate.

The moving image control apparatus 10 is a computer or a computer system that optimizes a QoE target value provided in the bitrate selection method disclosed in NPL 4. An optimal QoE target value is provided in the bitrate selection method so that engagement and a cost are simultaneously controlled and bitrate control with balanced engagement and cost is realized.

The client 20 is a terminal used by a user who views moving images. The client 20 selects an appropriate bitrate using a QoE target value from the moving image control apparatus 10 and then requests delivery of moving image data (chunks) with the selected bitrate to the moving image delivery server 30. Meanwhile, for example, a personal computer (PC), a smartphone, a tablet terminal, a game machine, a TV, a wearable device, or the like can be conceived as the client 20.

The moving image delivery server 30 is a computer or a computer system that delivers moving images to the client 20. The moving image delivery server 30 delivers, in response to a moving image data request (i.e., a request for delivery of moving image data (chunks) with a selected bitrate) from the client 20, moving image data with the bitrate to the client 20.

Here, the moving image control apparatus 10 in the embodiment of the present invention includes a QoE target value calculation unit 101, a viewing information update unit 102, and a distribution information update unit 103 as functional units, as illustrated in FIG. 1. In addition, the moving image control apparatus 10 in the embodiment of the present invention includes a distribution information DB 104 and a viewing information DB 105 as storage units.

First, the overall operation of the moving image control system 1 in the embodiment of the present invention will be described. The moving image control system 1 in the embodiment of the present invention executes operations of S1 to S5 below.

S1) The client 20 transmits viewing conditions to the QoE target value calculation unit 101 before start of viewing of a moving image.

S2) Subsequently, the QoE target value calculation unit 101 of the moving image control apparatus 10 acquires distribution information stored in the distribution information DB 104 on the basis of the provided viewing conditions, calculates an optimal QoE target value using the acquired distribution information, and returns the optimal QoE target value to the client 20.

S3) The client 20 selects a bitrate that minimizes costs while satisfying the received QoE target value and obtains a viewing time, a traffic amount, and an estimated QoE value. Then, the client 20 transmits the viewing time, the traffic amount, and the estimated QoE value to the viewing information update unit 102. Meanwhile, at this time, the client 20 may transmit the viewing conditions along with the viewing time, the traffic amount, and the estimated QoE value.

S4) The viewing information update unit 102 of the moving image control apparatus 10 updates viewing information stored in the viewing information DB 105 on the basis of the viewing conditions, the viewing time, the traffic amount, and the estimated QoE value.

S5) In addition, the distribution information update unit 103 regularly acquires viewing information from the viewing information DB 105 and then updates distribution information stored in the distribution information DB 104 on the basis of the acquired viewing information in asynchronization with the aforementioned steps S1 to S4 (or in synchronization with the aforementioned steps S1 to S4).

According to the above-described operations of S1 to S5, the moving image control system 1 in the embodiment of the present invention can cause a QoE target value to converge on an optimal value while simultaneously updating distribution information of a utility function with respect to a QoE value for each viewing condition. Here, the aforementioned viewing condition represents any of a content type, a user type or a service type, or a combination of two or more thereof.

Distribution information of the utility function for each of the viewing conditions is stored in the distribution information DB 104. Here, an example of distribution information stored in the distribution information DB 104 is illustrated in FIG. 2. Each piece of distribution information illustrated in FIG. 2 includes a viewing condition, a list of averages μ with respect to each QoE value, a list of standard deviations σ with respect to each QoE value, and the number of views. In the example illustrated in FIG. 2, the list of averages μ and the list of standard deviations σ are lists having a length of 401. In these lists, an i-th element (here, i∈{0, 1, . . . , 400})

represents an average and a standard variation in an estimated distribution when a QoE target value is (i+100)/100.

In addition, viewing information for each of the aforementioned viewing conditions is stored in the viewing information DB 105. Here, an example of the viewing information stored in the viewing information DB 105 is illustrated in FIG. 3. Each piece of viewing information illustrated in FIG. 3 includes a viewing condition, an estimated QoE, and a utility function value. An arbitrary model may be used as an estimation model for acquiring an estimated QoE and, for example, the model disclosed in the aforementioned NPL 5 may be used. Although the client 20 calculates an estimated QoE in the embodiment of the present invention, the present invention is not limited thereto and, for example, information necessary to calculate an estimated QoE may be transmitted from the client 20 to the viewing information update unit 102 and the estimated QoE may be calculated through the viewing information update unit 102.

Meanwhile, although a utility function value is calculated as Utility=e−w×c, at least one of e and c may be calculated by the client 20 or the viewing information update unit 102. When e and c are calculated by the viewing information update unit 102, for example, "content length" and "maximum data amount that can be transmitted" may be transmitted from the client 20 to the viewing information update unit 102 in addition to a viewing time and a traffic amount. Alternatively, the viewing information update unit 102 may identify "content length" and "maximum data amount that can be transmitted" from a content type and the like included in viewing conditions, for example.

Next, detailed operations of the QoE target value calculation unit 101 and the distribution information update unit 103 will be described. As will be described below, the QoE target value calculation unit 101 performs calculation of an acquisition function value in Bayesian optimization and the distribution information update unit 103 performs update of a distribution in Bayesian optimization. The calculation and the update are repeatedly executed to optimize a QoE target value.

The QoE target value calculation unit 101 accesses the distribution information DB 104 on the basis of viewing conditions received from the client 20 and acquires distribution information corresponding to the viewing conditions. Subsequently, the QoE target value calculation unit 101 calculates an upper confidence bound (UCB) score for each QoE target value (i.e., a UCB score is used as an acquisition function value of Bayesian optimization in the embodiment of the present invention). When the UCB score is denoted as "UCB Score", the UCB score is calculated through UCB Score=μ+α$_t$×σ.

$$\alpha_t = \sqrt{\log t} \qquad [\text{Math. 1}]$$

Here, t is the number of views and log is a natural logarithm.

In addition, the QoE target value calculation unit 101 calculates a QoE target value for which the UCB score is maximized and returns the QoE target value to the client 20. Meanwhile, although the QoE target value calculation unit 101 calculates a QoE target value for which the UCB score is maximized in the embodiment of the present invention, the present invention is not limited thereto and, for example, the viewing information update unit 102 may calculate a QoE target value for which the UCB score is maximized in advance.

The distribution information update unit 103 acquires (one or more pieces of) viewing information corresponding to viewing conditions received from the client 20 from the viewing information DB 105 and updates the distribution information DB 104 using the viewing information. As an example, a case in which there are three views with respect to certain viewing conditions and a QoE value is x=(x$_1$, x$_2$, x$_3$), and a utility function value is y=(y$_1$, y$_2$, y$_3$) at that time is described in the embodiment of the present invention. Meanwhile, it is assumed that x and y are represented by row vectors.

At this time, an average value μ(a|y) when a QoE target value is a is defined by the following mathematical expressions.

$$\mu(a \mid x) = yK_t^{-1}s(x, a) \qquad [\text{Math. 2}]$$

Here, $$K_t = \begin{bmatrix} k(x_1, x_1) & k(x_1, x_2) & k(x_1, x_3) \\ k(x_2, x_1) & k(x_2, x_2) & k(x_2, x_3) \\ k(x_3, x_1) & k(x_3, x_2) & k(x_3, x_3) \end{bmatrix} \qquad [\text{Math. 3}]$$

$$k(a, a') = \sigma_0^2 g(\|a - a'\|_\lambda)$$

$$\|a\|_\lambda = \frac{a}{\lambda}$$

$$g(z) = \exp\left(-\frac{z^2}{2}\right)$$

$$s(x, a) = \begin{bmatrix} k(x_1, a) \\ k(x_2, a) \\ k(x_3, a) \end{bmatrix}$$

It is assumed that $\sigma_0^2$ and λ are set in advance.

In addition, a variance σ$^2$(a|y) when a QoE target value is a is defined by the following mathematical expressions.

$$\sigma^2(a \mid y) = k(a, a) - s(a, x)K_t^{-1}s(x, a) \qquad [\text{Math. 4}]$$

Here, s(a, x)=[k(a, x$_1$), k(a, x$_2$), k(a, x$_3$)] and it is assumed that definitions of other elements are the same as those used for μ(a|y).

The distribution information update unit 103 calculates values for 401 numbers of a from a=1.00 to 5.00 at intervals of 0.01 with respect to μ(a|y) and μ(a|y) and arranges the values in a length of 401. Then, the distribution information update unit 103 updates distribution information stored in the distribution information DB 104 using the arrangement.

<Hardware Configuration of Moving Image Control Apparatus 10>

Figure 4:
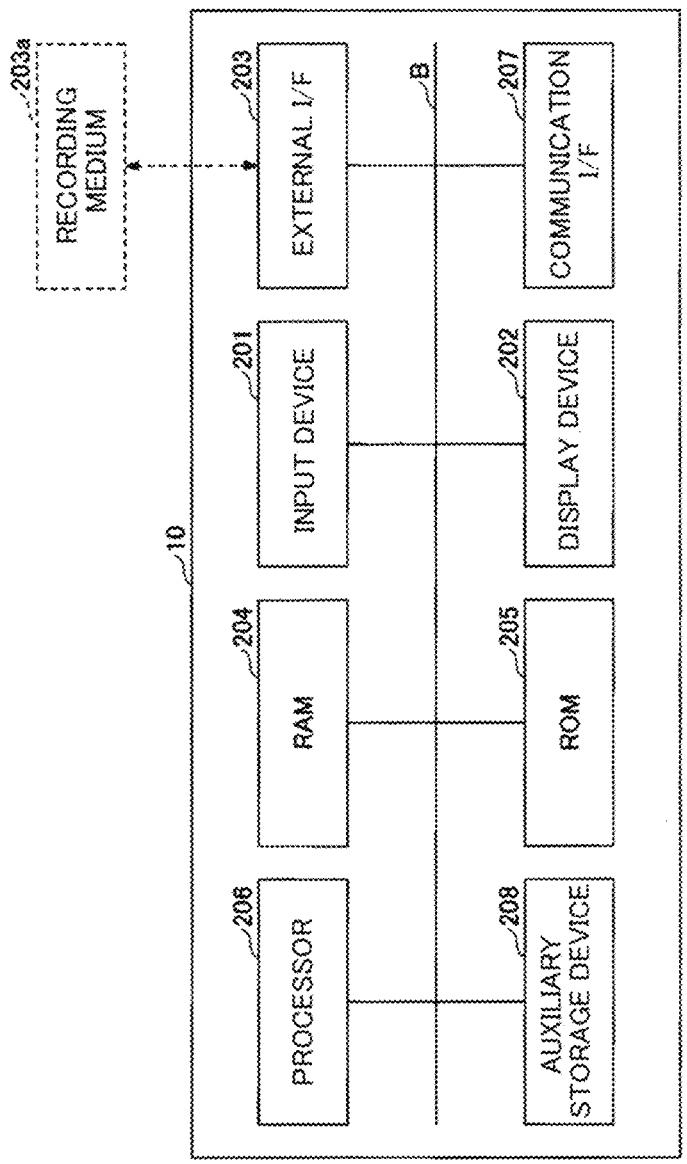
FIG. 4 is a diagram illustrating an example of a hardware configuration of a moving image control apparatus in an embodiment of the present invention.

Finally, a hardware configuration of the moving image control apparatus 10 in the embodiment of the present invention will be described with reference to FIG. 4. FIG. 4 is a diagram illustrating an example of the hardware configuration of the moving image control apparatus 10 in the embodiment of the present invention.

As illustrated in FIG. 4, the moving image control apparatus 10 in the embodiment of the present invention includes, as hardware, an input device 201, a display device 202, an external I/F 203, a random access memory (RAM) 204, a read only memory (ROM) 205, a processor 206, a communication I/F 207, and an auxiliary storage device 208. These pieces of hardware are connected through a bus B such that they can communicate.

The input device 201 may be, for example, a keyboard, a mouse, a touch panel, or the like. The display device 202 may be, a display or the like. Meanwhile, the moving image control apparatus 10 may not include at least one of the input device 201 and the display device 202.

The external I/F 203 is an interface with external devices. The external devices include a recording medium 203a and the like. The moving image control apparatus 10 can perform reading, writing, and the like on the recording medium 203a through the external I/F 203. The recording medium 203a may store, for example, one or more programs and the like that realize each functional unit (i.e., the QoE target value calculation unit 101, the viewing information update unit 102, and the distribution information update unit 103) included in the moving image control apparatus 10.

The RAM 204 is a volatile semiconductor memory that temporarily stores programs and data. The ROM 205 is a nonvolatile semiconductor memory that can hold programs and data even when power is cut. The ROM 205 may store, for example, setting information about an operating system (OS), setting information about a communication network, and the like.

The processor 206 may be, for example, a central processing unit (CPU) or the like. Each functional unit included in the moving image control apparatus 10 is realized by the processor 206 executing processing of one or more programs stored in the ROM 205, the auxiliary storage device 208, and the like and read to the RAM 204.

The communication I/F 207 is an interface for connecting the moving image control apparatus 10 to a communication network.

The auxiliary storage device 208 may be, for example, a hard disk drive (HDD), a solid state drive (SSD), or the like and may be a nonvolatile storage device that stores programs and data. The programs and data stored in the auxiliary storage device 308 may include, for example, an OS, application programs that realize various functions on the OS, one or more programs that realize each functional unit included in the moving image control apparatus 10, and the like.

In addition, each storage unit (i.e., the distribution information DB 104 and the viewing information DB 105) included in the moving image control apparatus 10 can be realized using the auxiliary storage device 208, for example.

The moving image control apparatus 10 in the embodiment of the present invention can realize the various processes described above by including the hardware configuration illustrated in FIG. 4. Meanwhile, although a case in which the moving image control apparatus 10 in the embodiment of the present invention is realized as one apparatus (computer) is illustrated in the example shown in FIG. 4, the present invention is not limited thereto. The moving image control apparatus 10 in the embodiment of the present invention may be realized as a plurality of apparatuses (computers). In addition, one apparatus (computer) may include a plurality of processors 206 and a plurality of memories (the RAM 204, the ROM 205, the auxiliary storage device 208, and the like).

The present invention is not limited to the embodiments specifically disclosed above and may be modified and changed in various manners without departing from the scope of the claims. For example, an engagement index in the embodiment of the present invention is not limited to a viewing time, and an explicit evaluation result of a moving image, a degree of user satisfaction acquired from an external sensor, and the like may be used. In addition, a cost is not limited to a traffic cost, and costs for performing communication and the like may be used.

REFERENCE SIGNS LIST

1 Moving image control system
10 Moving image control apparatus
20 Client
30 Moving image delivery server
101 QoE target value calculation unit
102 Viewing information update unit
103 Distribution information update unit
104 Distribution information DB
105 Viewing information DB

The invention claimed is:

1. A control apparatus for performing bitrate control in a moving image streaming service, the control apparatus comprising: processing circuitry configured to:
calculate a quality target value used in the bitrate control such that a utility function including a predetermined engagement index value is optimized by Bayesian optimization;
receive the calculated quality target value,
estimate and update, based on the Bayesian optimization, distribution values of the utility function, in response to receiving the quality target value, and
output, an optimized quality target value that maximizes a total sum of (i) an average value of the values of the utility function and (ii) a value that is obtained by multiplying a square root of a natural logarithm value of the number of views of the moving image by a standard deviation of the updated distribution values of the utility function.

2. The control apparatus according to claim 1, wherein the utility function further includes a parameter relating to a predetermined cost.

3. A control method executed by a computer to perform bitrate control in a moving image streaming service, the control method comprising:
calculating a quality target value used to control the bitrate such that a utility function including a predetermined engagement index value is optimized by Bayesian optimization;
receiving the calculated quality target value,
estimating and updating, based on the Bayesian optimization, distribution values of the utility function, in response to receiving the quality target value, and
outputting, an optimized quality target value that maximizes a total sum of (i) an average value of the values of the utility function and (ii) a value that is obtained by multiplying a square root of a natural logarithm value of the number of views of the moving image by a standard deviation of the updated distribution values of the utility function.

4. A non-transitory computer readable medium storing a program that causes a computer to execute the method according to claim 3.

* * * * *